United States Patent [19]
Hanson

[11] 3,727,777
[45] Apr. 17, 1973

[54] LOADER FOR TRUCKS
[76] Inventor: Douglas R. Hanson, 1720 9th Avenue, Minn. 55303
[22] Filed: May 7, 1971
[21] Appl. No.: 141,225

[52] U.S. Cl. ................................214/41, 214/38 BA
[51] Int. Cl. ...............................................B65g 67/04
[58] Field of Search ......................214/38 B, 38 BA, 214/38 C, 38 D, 41, 516

[56] References Cited

UNITED STATES PATENTS 3,337,066   8/1967   Reed et al..........................214/38 C
3,221,912   12/1965   McWilliams..........................214/514
3,599,262   8/1971   Carder et al..................214/38 BA X Primary Examiner—Robert G. Sheridan
Attorney—Dugger, Peterson, Johnson & Westman

[57] ABSTRACT

A loader for trucks or other vehicles which can be automatically operated, and which utilizes a loading slide which is initially inserted into a vehicle to be loaded, and which is moved automatically out of the vehicle as loading commences. An interlocking means can be provided for controlling the various functions of the loader assembly, and in this manner the loading can be automatic.

11 Claims, 11 Drawing Figures

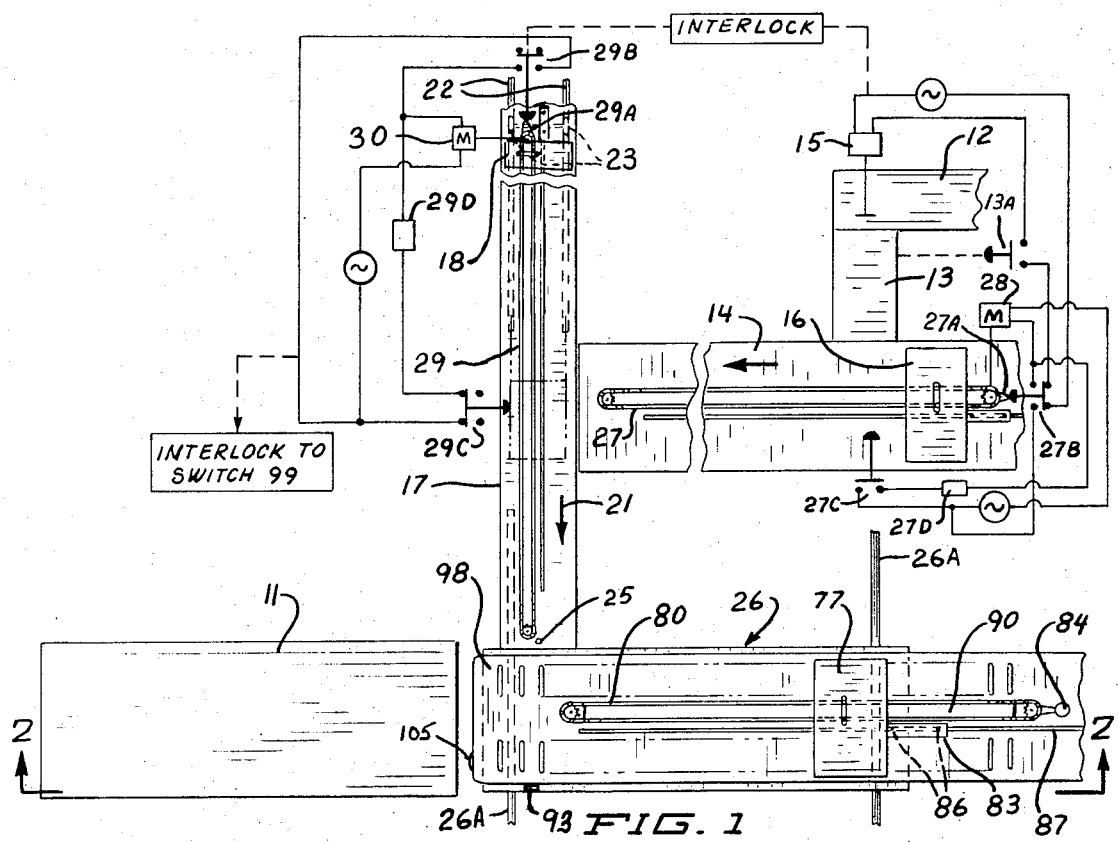
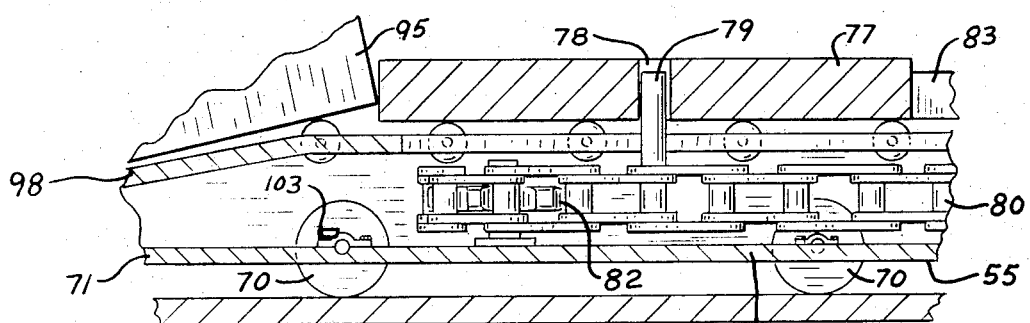
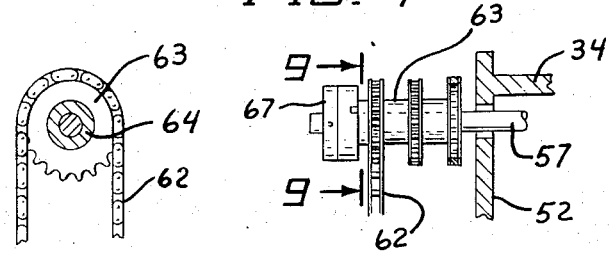

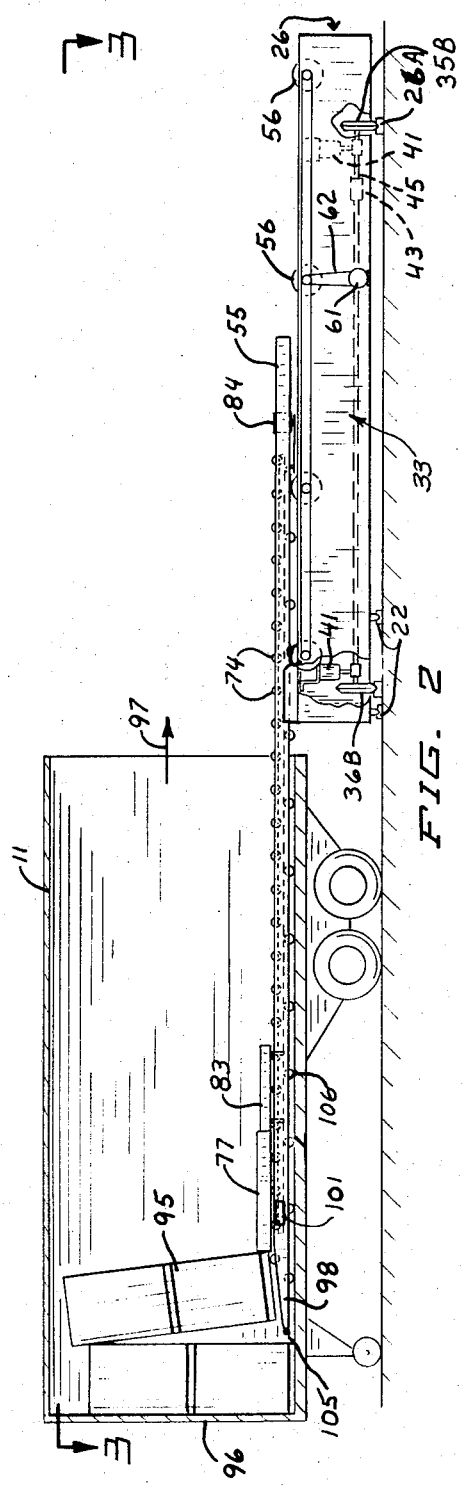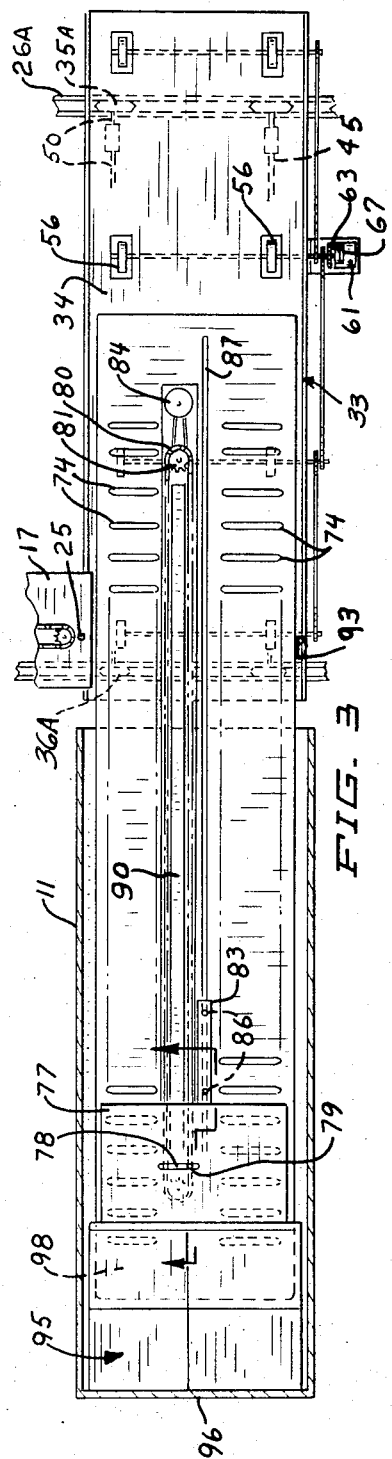

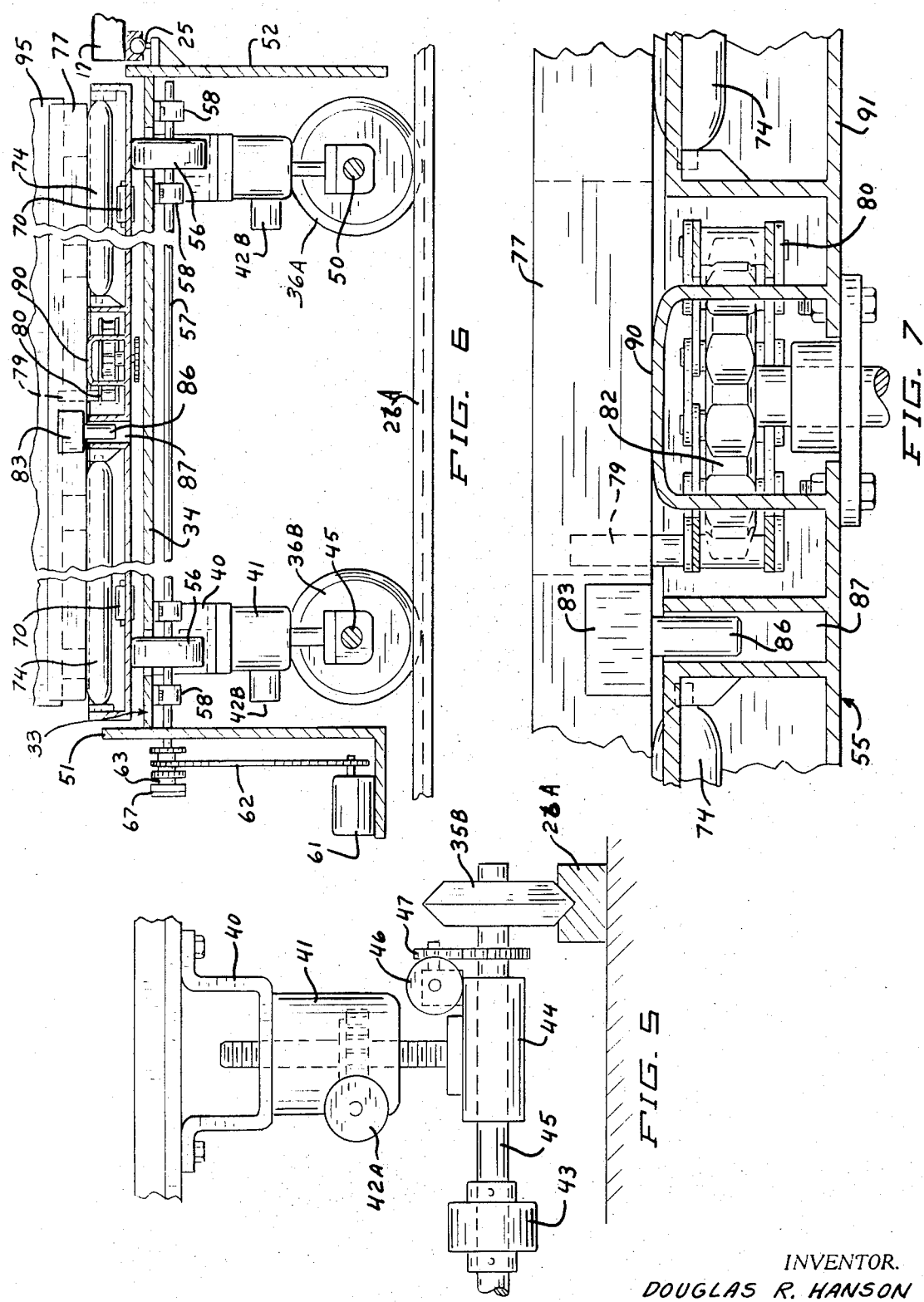

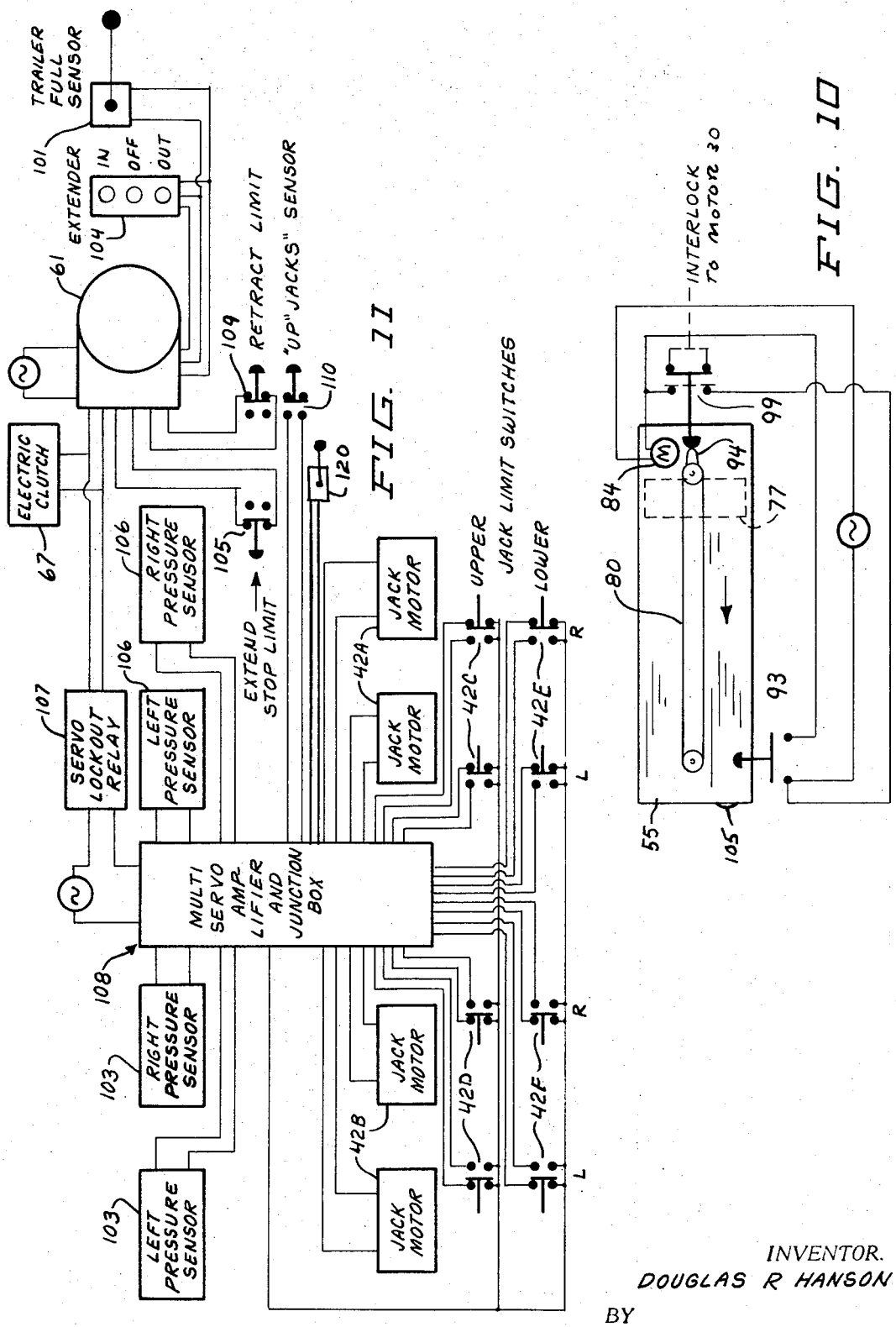

LOADER FOR TRUCKS

BACKGROUND OF THE INVENTION

1. Field of the Invention.

The present invention relates to vehicle loading devices.

2. Prior Art

There have been a number of loading devices in the prior art, which are utilized for loading vehicles such as trucks with pallets or palletized material. For example, U.S. Pat. No. 3,337,066 shows a vehicle loading and unloading apparatus which is quite costly to make, cumbersome in operation, and includes many components that must be operated for the loading operation.

The idea of using a two direction positionable conveyor system for loading devices is shown broadly in U.S. Pat. No. 1,608,213, but this is used for unloading railroad cars. An external bed leveling mechanism for trucks is shown in U.S. Pat. No. 3,397,802, and automatic handling of palletized loads is shown in U.S. Pat. No. 3,421,641. U.S. Pat. No. 2,139,667 shows a form of a loader-assembler which preforms the loads and deposits each load in turn into the loader and then the loader deposits the load into a truck.

Another type of leveling device for truck loading and unloading is shown in U.S. Pat. No. 3,250,408. There are various other types of pallet arranging devices and the like in the prior art.

SUMMARY OF THE INVENTION

The present invention relates to a loading device. The device can be completely automated, and is capable of being moved to a number of different stations, and uses a loading slide member which inserts into the vehicle to be loaded, and which automatically retracts as the loads are inserted into the vehicle.

The invention further comprises adjusting means for adjusting the correct height of the loader assembly, and means for moving the loader assembly transversely to a plurality of different loading positions. A sensor for insuring that further loading will not occur when room left in the truck is not sufficient to take additional pallets being loaded is provided.

The device is simple to make, and easily operated and eliminates much of the mechanism of the prior art.

BRIEF DESCRIPTION OF THE DRAWINGS

FIG. 1 is a top plan view of a schematic layout of the arrangement of the present invention;

FIG. 2 is a view taken substantially on line 2—2 of FIG. 1, with a loading slide shown inserted into a truck and two pallets partially loaded thereon;

FIG. 3 is a top plan view taken as on line 3—3 in FIG. 2;

FIG. 4 is a fragmentary enlarged sectional view taken as on line 4—4 in FIG. 3;

FIG. 5 is an enlarged side view of a typical support device used with the present invention;

FIG. 6 is an end sectional view of the conveyor support table and loading slide of the present invention;

FIG. 7 is an enlarged detail end sectional view of a conveyor slide drive;

FIG. 8 is a side view of drive sprockets for a slide drive;

FIG. 9 is an end sectional view of the device of FIG. 8; and

FIGS. 10 and 11 are schematic representations of a control arrangement used with the present invention.

DESCRIPTION OF THE PREFERRED EMBODIMENT

A trailer loading arrangement illustrated generally at 10 is, as shown, used for loading semitrailer bodies or other trucks or vehicles. A typical trailer is illustrated at 11. Means are provided for arranging load pallets (or crates, boxes or other items) for loading the truck. Schematically, one such arrangement comprises a pallet delivery conveyor 12. A pusher 15 is provided for moving pallets from the conveyor 12 into a pallet stacking device 13, wherein pallets coming from member 12 are stacked vertically, and arranged in a two high, two wide stack. The pusher 15, or another separate long stroke pusher moves the pallet stack onto a fixed cross conveyor 14. The conveyor includes a pusher 16 which is actuated by a driven chain 27 for moving stacks of pallets toward a movable set of conveyors. The stacks of pallets are deposited on a first movable cross conveyor table 17, and are moved through a suitably driven pusher conveyor shown generally at 18, operating on scotch yoke principle driven by a chain 29, so that the pallets on the conveyor table 17 are moved in direction as indicated by the arrow 21. The conveyor 17 is movably mounted on a pair of tracks 22,22 through suitable wheels, shown only generally at 23. The wheels are at the outer end of this conveyor table 17, and the end of the conveyor table opposite from the wheels is mounted through a suitable ball joint arrangement 25 to a main loading table assembly 26. The loading table assembly 26 is also mounted on suitable rails illustrated generally at 26A, through four wheels. The entire conveyor 17 and loading table assembly 26 can thus be moved back and forth along these tracks to different transverse positions for loading trailers 11 in different locations from that shown. The drive means for moving the tables will be more fully explained. The means for stacking the pallets and moving the pallets onto the conveyor 17, and the means for moving the pallets toward the loading table 26 can be any desired type of devices. The pallet arrangers are well known in the art. It should be noted that both the table 26 and the cross conveyor 17 move relative to the conveyor 14, and the stacker 13, and the pallet supply conveyor 12 which do not move transversely.

The pusher 16 for conveyor 14 is operated with a scotch yoke assembly from the chain 27 that is driven with a motor 28 shown only schematically. The pusher 18 for the conveyor table 17 is driven with a pin carried by the chain 29. Chain 29 is mounted over sprockets mounted on the conveyor table 17 and moves the pusher 18 when the chain is driven by a motor 30. The pin conveyors operating the pushers 16 and 18, are identical to the drive for a conveyor that operated in connection with the loading table 26, and thus the construction is shown only schematically.

The main loading table 26 comprises a main support table or frame 33. The support 33 includes a table top member 34, and the support wheels for the support table are mounted with respect to the top 34. Support wheels 35A and 35B are mounted at the outer end, (away from truck 11) and wheels 36B and 36A are mounted at the end of the table adjacent the trailer 11. The wheels are supported individually with vertically adjustable screw jacks but wheels 35A and 36A are connected with an axle, and the wheels 35B and 36B are also connected with an axle. These screw jacks are shown typically in FIG. 5, and are individually operated for height adjustment.

The table top 34, as shown, supports brackets 40, one for each of the support wheels, and each of the brackets in turn mounts a screw jacket assembly 41. In FIG. 5, the wheel 35B is shown, and this is the power wheel for the unit. The screw jacks 41 are conventional screw jacks, for example the screw jacks sold by Duff-norton Company, Charlotte, North Carolina, and are each operated with a separate electric motor 42A or 42B. The motors 42A are used on the wheels on the outer end of the unit (away from the trailer), and the motors 42B are seen in FIG. 6 at the inner end of the unit. If desired the screw jacks for the wheels 35A and B can be connected with a shaft for simultaneous operation, as can the jacks for wheels 36A and B.

The wheels 35B and 36B are mounted onto axle 45, and the axle 45 is mounted in suitable bearing members 44 which are attached to the respective ends of the screw jacks 41. The axle 45 is made of two sections connected together with an electric clutch 43 which is normally engaged so that the axle sections of axle 45 must rotate together as a unit, but the clutch can be released upon actuation by an operator to permit the wheels 35B and 36B (which are drivably mounted on opposite ends of the axle) to move independently of one another. The table 33 is driven along tracks 26A through the use of an electric motor 46 operating through a chain drive assembly 47 to the transverse axle assembly 45.

The wheels 35A and 36A are connected together with a transverse axle assembly 50 that extends between the wheels 35A and 36A and supports them. The axle 50 is also supported in suitable bearing housings 44 mounted on the respective screw jacks. The bearing assemblys 44 permit the axles to rotate freely. An electric clutch assembly 43 is used in the axle 50 to permit individual movement of the wheels 35A and 36A. The clutches 43 permit cocking the table 26 slightly along its tracks 26A to obtain perfect alignment of the table with the tailer 11 is desired. The motor 46 can be driven to drive the entire table assembly 26, which will pull the conveyor 17 along the tracks 22 to properly position the unit behind a trailer to be loaded.

The table assembly 33 has side members 51 and 52, respectively fixed to the table top 34, and these side members go upwardly above the table top 34 and are fastened thereto to provide side guides for a loading slide or tongue illustrated generally at 55. The side guide members keep the slide 55 in position on the table top. The slide 55 comprises a movable member that is mounted for movement along the table top, and may be driven through the use of friction drive wheels illustrated generally at 56 which support the slide. The slide 55 is made of two spaced plates which are reinforced and supported by desired web members.

Referring specifically to FIG. 6, it can be seen that the drive wheels 56 are mounted on cross shafts 57 and extend across the table. The shafts 57 are supported in suitable bearings 58 so that the wheels 56 stick up above the table top 34 a desired distance. The bottom plate of the slide member 55 rests on these wheels. The shafts 57 (and thus wheels 56) are all driven together with suitable chain arrangements shown at 60. A reversible drive motor 61 is used for driving a key shaft 57 shown in FIG. 6, through a chain 62 driving up to a triple sprocket 63. The triple sprocket 63 includes a sprocket for the chain 62, and for chains going to the shafts 57 in each direction from this key shaft.

The triple sprocket 63 is mounted onto the shaft 57 with a oneway drive clutch 64 that permits the sprocket to drive the wheels 56 in direction to drive the slide 55 toward the truck 11 but permit the wheels 56 to free wheel in opposite direction. However, in order to also provide a reverse drive of the wheels 56, an electric clutch 67 can be mounted between the outer end of the key shaft 57, and the outer sprocket or end of triple sprocket 63 as shown in FIG. 8. The electric clutch 67 is normally disengaged to permit free wheeling reverse movement of the wheels 56. The clutch normally permits the sprockets to drive the slide in forward direction when motor 61 is driven as indicated by arrow 65 and all of the wheels 56 to free wheel to permit the slide 55 to move in opposite direction because of the free wheeling oneway clutch 64. When the electric clutch 67 is energized, it is made to lock the sprocket 63 to the key shaft 57 so the sprocket 63 drives in either direction of rotation. By reversing the direction of rotation of reversible motor 61, the wheels 56 can then be reversed for moving the slide 55 out of the trailer 11 when the last pallet has been loaded into the trailer. However, it should be remembered that the electric clutch 67 is normally disengaged and the wheels 56 will free wheel when the slide member is pushed in opposite direction from the arrow 65. The electric clutch 67 is on the drive shaft that is directly above the motor 61, and the oneway clutch is also only on the triple sprocket 63. The chain arrangement is shown generally in FIGS. 8 and 9.

The slide assembly 55 as shown is provided with rollers 70 suitably rotatably mounted thereon and extending downwardly below the bottom wall 71 of the slide 55. These rollers can be mounted in any suitable manner, and do not engage the table top 34 when the slide is resting on the rollers 56, but as shown in FIG. 4 will ride against the bottom 91 of the trailer 11 when the slide is pushed forwardly into the trailer, as shown in FIG. 3. In addition, the slide member 55 has a top wall on which suitable transverse rollers 74 are also mounted. The rollers 74 protrude slightly above the top wall of the slide member 55 and are rounded at their ends to permit the pallets to be slid onto the rollers. The rollers 74 are made up in two rows on the sides of the slide so that pallets skids can ride on these rollers. The pallet skids can be slid in axial direction of the roller when they are being loaded from the conveyor 17 onto the slide 55. It should be noted in FIG. 6 that the table 17 is mounted at a sufficient height so that pallets being skidded along the table 17 will slide across these rollers 74 and be positioned on the pallet slide.

The slide member 55 also has a pusher device 77 mounted therein for longitudinal movement therealong. The pusher device 77 has a slot 78 defined in the center thereof (see FIG. 4), and the slot 78 houses a pin 79 which is attached to an endless chain member 80. The chain 80 is mounted over a pair of sprockets 81 and 82 respectively, which are mounted at opposite ends of the slide member 55. A motor 83, which is shown schematically, is used to drive the sprocket 81, to drive the chain 80 in its endless path about the sprockets. At the same time, the pin 79 will be moved with the chain and the pin will ride in the slot 78 and move the pusher member 77 along the slide member 55. A stabilizing bar 83 is attached to the pusher 77 and has a pair of pins 86 that extend down into a slot 87 through the top wall of the slide member 55 to stabilize the pusher member in its path of movement, as the pusher member 77 moves back and forth. It should be noted that this action is much like a scotch yoke, and when the pin 79 reaches the end of travel around sprocket 82, it will reverse direction and the pusher member 77 will also reverse direction and go back toward the outer end of the slide 55. When the pin 79 has traveled down to the sprocket 81, the pin 79 will again move to the opposite end of slot 78, and the pusher 77 will reverse direction and go back toward the inner end or tapered end of the slide member 55.

Thus the pusher member can be used for pushing anything that is resting on the top of the slid member 55 and it will push items along the length of slide 55. It should also be noted in FIGS. 6 and 7, that an inverted channel shaped center support 90 is mounted onto the bottom plate 71 of the slide member 55. The support 90 extends between the side reaches or portions of the chain 80 to support the pallets as they are slid transversely across the opening which is provided for the chain 80 and the connected pin 79, without dropping in the hole for the chain 80. The slot 87 for the pins 86 of stabilizing bar 83 is very narrow so that the pallets can slide across the slot.

The pallet support blocks, which are shown in dotted lines in FIG. 6, are arranged so that when the pallets are properly positioned they will be resting on the rollers 74 on the top of the slide member 55. The mounting for the rollers 74 can be of any desired type. It should be noted the ball joint 25 for the conveyor 17 is shown in FIG. 6. The table 17 can tilt or twist to accommodate different heights of the loading table 26. When the trailers are to be loaded, a plurality of pallets illustrated generally at 95 are stacked two abreast and two high by the stacking device 13. The motor 61 is driven to drive the slide 55 into the trailer 11 as will be more fully explained.

When in operation, the stacker 13, conveyor 14 and pusher 15 are controlled as shown schematically in FIG. 1, and an interlock between the stacker and first conveyor 14 can comprise a system whereby a cam member shown schematically at 27A is carried by the chain 27 for the pusher 16 on conveyor 14. The cam will operate a limit switch 27B when pusher 16 is in its home (retracted) position, to close a set of contacts, as shown in solid lines in FIG. 1. A "stack complete" limit switch 13A also is in the same circuit to the pusher 15. A further interlock to insure that conveyor 17 is ready to receive additional load also can be in this circuit. Assuming that the pusher 18 is properly positioned, when the stack complete limit switch 13A is closed, and the proper set of contacts in switch 27B are also closed, the pusher 15 will operate to move a two high, two wide pallet stack out onto the conveyor 14 in front of the pusher 16. When the pallets are in their proper position, they will close a limit switch 27C which will operate through a time delay relay 27D to energize motor 28, as shown schematically. The time delay 27D is present to insure that the pusher 15 is home before pusher 16 is opeated. Motor 28 drives chain 27 and this will move the pusher 16 against the pallets on the conveyor 14. Cam 27A moves away from its home position and this will permit the switch 27B to go to its normal position closing a second set of contacts, completing an independent circuit to the motor 28, even after the pallets have been moved away from the switch 27C. This will mean the motor 28 will continue to drive until the chain 27 has again completed its circuit of movement and the cam 27A has moved switch 27B back to its solid line position as shown in FIG. 1, and has broken the circuit to the motor 28. There will be no pallets closing the switch 27C, and the motor 28 will stop until the switch 13A, is again closed (and the interlock form conveyor 17 indicates ready) operating pusher 15 and moving pallets to close the switch 27C.

The same type of interlock is used to operate the conveyor 17. A cam 29A is shown schematically on chain 29 for the conveyor pusher 18. This cam 29A operates a switch 29B, which is shown when the cam is in a home position, will move the switch 29B to its solid line position shown in FIG. 1, and will break the circuit to the motor 30. The switch 29B may have another set of contacts which as shown supplies the interlock signal to the circuit for psher 15. As shown in FIG. 1, a limit switch 29C is already operated by pallets shown on dotted lines on the conveyor, which are moved there by the pusher 16, and as shown in solid lines this limit switch is in its closed position because the pallets are in place, completing a circuit to the motor 30 through a time delay relay 29D. Motor 30 will drive the chain 29. Once the cam 29A is moved away from the switch 29B, the switch 29B will move to position to complete a circuit to the motor 30 independently of the switch 29C. Thus the pusher 18 has moved to engage the pallets on the conveyor 17, and has moved the pallets away from the switch 29C, even though that switch will open, the motor 30 will continue to run until the chain 29 has traveled in its path back to home position so that the cam is back to position to move the switch 29B to its solid line position and break the circuit to the motor 30 until an additional set of pallets are placed on the conveyor 17. When the pusher 18 has been retracted sufficiently (for example to its home position) the interlock to conveyor 14 will indicate that this conveyor 14 can again operate. An interlock also is provided from the motor circuit for motor 30 to the motor 84 so that the pusher 18 will not be operated until the timing is proper to insure that the pusher 77 will be out of the way when any pallets are psuhed by the pusher 18 onto the slide 55.

As shown in FIG. 10, for operation of the conveyor on slide 55, a normally open limit switch 93 is mounted on table 33 aligned with the conveyor 17. The switch 93 will be closed when the pallets are properly positioned on slide 55 by conveyor 17. This will energize motor 84, through a time delay relay, causing chain 80 to run. To insure that chain 80 stops with pusher 77 retracted, the chain 80 also carries a cam 94 which controls a normally closed limit switch 99. Assuming the pusher 77 is in its retracted position, switch 99 would be as shown in dotted lines, and switch 93 would also be open if no pallets are properly placed on the slide. This portion of switch 99 can be used as the interlock signal to the motor 30. When the pallets are placed on the slide 55, by conveyor 17, the pallets cause limit switch 93 to close, energizing the motor 84 and driving chain 80 and pusher 77. The cam 94 will then move off limit switch 99 permitting the switch to close a circuit to motor 84. The motor 84 will remain energized after the pallets have been moved away from switch 93, have been pushed off the slide and until the cam again gets to its home position.

Once the pallets are positioned on the slide 55, (assuming the slide is already in the trailer) and with the motor 84 running, the pusher 77 will be pushed through the pin 79 acting in slot 78 to engage the pallets 95 and move them into the trailer along the slide member 55. Once the pallets are moved by the pusher 77, the first group of pallets will engage the end wall 96 of the trailer, and when this happens the pallets can be moved no further, but the pusher 77 will still want to move because the pin 79 and the chain will not have gone around the end sprocket 82 yet. This will cause a reaction to occur tending to push the pallets against the wall 96 and at the same time the reaction on the slide 55 will cause the slide to move backwardly as indicated by the arrow 97 the required distance to slide the pallets off the end portion 98 of the slide 55 down onto the floor of the truck. The free wheeling oneway clutch 64 permits this rearward movement of the slide 55.

After the pallets are clear of the end of slide 55 the pusher 77 will then be reversed in direction as previously explained when the pin 79 passes over to the other side of the slot 78 and reverses in direction of movement with the chain 80. The pusher 77 will be moved out of the trailer and run until the switch 99 is opened by cam 94. In the meantime, additional pallets 95 will be assembled by the stacker 13 and conveyor 14, and may be moved onto the conveyor 17 when the interlock signals are proper. After the pusher 77 has cleared the table 17 as the pusher moves rearwardly, (as shown when cam 94 actuates switch 99) the motor 30 will be permitted to run and the pusher 18, which operates in the same manner as the pusher 77, will push the pallets onto the slide 55, again and close switch 93. The pusher 18 will move back toward its home position. The pusher 77 will again be driven as described and move toward the trailer to engage the new stack of pallets, and push them onto the trailer, where they engage outer sides of the previously loaded pallets as shown in FIG. 2. The reaction will cause the slide 55 to move rearwardly again because of the free wheeling wheels 56. The truck wall and previously loaded pallets provide a resistance to movement of the pallets on slide 55 and the reaction causes slide retraction. This loading operation will continue, and the slide 55 will continue to be pushed back out of the trailer automatically. To specifically go through a cycle of operation main power will be turned on and the slide 55 will be retracted when starting. The conveyor will be jockeyed behind a trailer to be loaded by operating motor 46.

Referring to FIG. 11, the slide extender control swtich 104 will be pushed to its "in position " which will drive motor 61, and as previously explained, drive the slide member 55 into the interior of the trailer so that the slide 55 goes to its full "in" position. The screw jacks are made so that they will be in their full "up" position, thus lifting the slide 55 high enough to clear any trailer. The extender motor control also operates servo lockout relay 107 which locks out or disables automatic circuits which are to be explained. The motor 61 will continue to drive until a limit switch 105, which is positioned at the inner end of the slide, contacts the front wall of the trailer. Switch 105 shuts off the motor 61, and at the same time de-energizes the servo lockout relay 107 and shutting off the motor 61. When the servo lockout relay 107 is disabled, the automatic controls including amplifiers and circuits illustrated generally at 108 will be energized. The slide 55 will still be raised from the trailer floor.

These automatic controls include front pressure or load sensors located on the left and right side respectively of the forward roller 70 to sense load on the front roller 70 for the slide 55. These front pressure sensors are indicated in FIG. 4 at 103. Also intermediate pressure sensors 106, are positioned on opposite sides of the slide to sense pressure or load on the ends of a center roller 70, for example a roller four or five rollers back from the forward end of the slide. These pressure sensors 103 and 106 are solid state pressure sensors of a strain gage or variable resistance type which deliver a signal when there is load on the rollers to which they are attached, or which they monitor, and supply signals to the servo amplifier and junction box assembly 108. The amplifiers and sensors are commercially available devices. The signals from the sensors are used, through the servo amplifiers, to operate the jack motors 42A and 42B of the unit. As soon as the swtich 105 has been opened, the sensors 103 and 106 will be operable to operate the jack motors 42A and 42B individually and because the rollers 70 are raised from the trailer floor and not under load, the jacks will lower the table 26 and thus lower slide 55 downwardly onto the trailer floor until the sensors 103 and 106 indicate that they are all contacting the floor. This means the slide will be resting on the trailer floor. The sensors operate the jack motors until they each are supporting substantially equal load. Then the jack motors will be shut off. The slide will be ready to use. Switch 105 shuts motor 61 out of the circuit completely, once it has opened, and the automatic operation will continue. The pallet conveyors can start moving pallets onto the slide 55 as described. The pusher 77 will be run through interlock circuits, to load pallets into the trailer and at the same time the slide will be automatically backed out because of the reaction force on the slide.

When the roller 70 on which sensors 106 are mounted clears the trailer, a switch 120 having a wheel that rides on the trailer floor will cut the sensor 106 out of the circuit. The switch 120 controls relays so it is effective only after it has once contacted the floor of the trailer or becomes "set." Then when it subsequently clears the floor of the trailer it will disable sensors 106 and has to be set again in the next cycle to be operable.

As the unit loads, the backing out of the device slide will continue as the pallets are loaded until a trailer full sensor 101 clears the end of the trailer, and operates a switch to drive the extender motor 61 in reverse direction. This switch will also energize the clutch 67 and will energize the servo lockout relay 107 to prevent automatic operation of the pressure sensors and jack motors. The trailer full sensor can merely be a limit switch that has a wheel on the actuator arm (as can switch 120) and which is positioned adjustably on the slide. The position of the sensor 101 is adjusted for pallets of different sizes. At the time when the space left in the trailer is less than that needed for one stack of the pallets being loaded, the wheel for sensor 101 will drop off the bottom of the trailer, actuating the sensor 101 to indicate that the trailer is so full it will not hold any more pallets. The electric clutch energization at this time is energized to insure that the motor 61 will drive the slide 55 rearwardly through the wheels 56, all the way back to its home position. Also, the conveyors 17 and 14 will be disabled. At the time the slide reaches its home position, limit switch 109 will be contacted and will break the circuit to the motor 61, the servo lockout relay 107 and clutch 67. At the same time, a second "-jacks up" switch 110 is actuated to a closed position by the movement of the slide 55 to its home position. This swtich 110 is used to reverse the normal operation of the jack motors 42A and 42B and to cut the switch 120 out of the circuit for sensors 106 so that the sensors 103 and 106, which are not now under load, (and which are operable when relay 107 is disabled) will instead of directing the jack motors to lower, will direct the jack motors to raise the table assembly 26 to its full up position. When it gets to its full up position, upper jack limit switches illustrated generally at 42C and 42D, will open, and these limit switches, which sense the jack position, will shut off the jack motors.

The entire table 26 can then be moved by motor 46 to a new trailer and the process repeated.

It should also be noted that the jacks for motors 42B and 42A are also controlled by lower limit switches 42E and 42F, respectively as well so that the jack motors will be shut off if they lower to their lowest permissable level under opeartion of the sensors 103 and 106.

The retraction of the slide 55 to its home position can also be utilzed as a signal for shutting down or disabling all circuits to the conveyors so that there will be no further loading until manually restarted.

It should be noted that the sensors 103 and 106 will sense movement of the rollers 70 and of the slide 55 away from the trailer floor. Thus if the trailer settles during loading and for example the sensor 106, which is on a middle roller, moves away from the trailer bed, or is not supporting its share of the load, the respective sensor will deliver a signal through servo amplifiers 108 to adjust jack motors 42A or 42B properly to get the proper leveling and sharing of load. Also, when two separate sensors on opposite sides of the slide are utilized, the individual jack motors can be operated to correct for any twisting or tilting of the trailer transversely as well as movement in fore and aft direction. This will keep the slide perfectly level at all times through the use of the sensors 103 and 106. The cam 94 on chain 80 can also be used, if necessary or desired to operate a disabling circuit for both sets of sensors 103 and 106 when pallets are on the slide so that the leveling action takes place only when the slide is unloaded.

This would prevent excessive shifting of the table 26 with pallets on the slide. However, the sensors themselves can be selected to block out signals which indicate high loads and be sensitive to low loads only to achieve the same objectives. The entire unit can be controlled as desired, and the use of a slide member, with a pusher conveyor gives proper loading and easy control with a minimum of parts and expense.

It also should be noted that the swtich 104 can be used to manually retract slide 51 (out position). Actuating the switch also will energize clutch 67 at the same time motor 61 is reversed.

The loader as shown can be used for loading boxes, pallets or items into fixed storage areas as well as into trailers. The conveyors 17 and 14 also can use rollers on the tops thereof, if desired.

What is claimed is:

1. A vehicle loading apparatus comprising a support frame, a slide member movably mounted on said frame, means to drive said slide member with respect to said frame and into the interior of a vehicle to be loaded, said vehicle having an end wall, means providing a station on which to load pallets onto said slide member, a pusher member mounted for longitudinal movement on said slide member to move pallets on said slide member along said slide member into the vehicle to be loaded, means to move said pusher member relative to the slide member to a first position wherein any pallets on said slide member will be moved off the slide by said pusher member, said slide member being free to move rearwardly when said pallets engage an object which resists movement thereof as the pallets are moved off the slide member, means to retract said pusher member from said first position to permit additional pallets to be placed on said slide member ahead of said pusher member.

2. The combination as specified in claim 1 and sensor means to indicate when the spacing in said vehicle is less than the necessay space to insert additional pallets.

3. The combination as specified in claim 1 and means to raise and lower said support frame for said slide member, and means on said slide member to sense when said slide member contacts a surface in a vehicle to be loaded, said means to sense when said slide member contacts said surface controlling said means to raise and lower said frame to cause leveling of said frame with respect to the vehicle to be laoded.

4. The combination as specified in claim 1 and electrical interlock means to control movement of said pusher member in relationship to positioning of pallets on said slide member.

5. The combination as specified in claim 1 wherein said means to move said slide member into said vehicle comprise friction drive wheels on said slide member, said friction drive wheels normally being free wheeling in one direction to permit said slide member to move rearwardly out of said vehicle.

6. The combination as specified in claim 5 and means to disable the free wheeling means to permit reverse driving of said friction drive wheels.

7. A vehicle loading apparatus for moving objects into a vehicle, comprising a support table, a slide member movably mounted on said support table, means to selectively drive said slide member into the interior of a vehicle to be loaded, a pusher member mounted on said slide member, drive means between said slide and said pusher to move said pusher to act between an object on said slide member and said slide member to move slide object along said slide member into the vehicle to be loaded, said pusher member traveling to a first position wherein any object on said slide member will be moved off said slide member onto said vehicle, said slide member moving rearwardly from reactive force between the object and vehicle when said pusher member removes the object from the slide member, and means to retract said pusher member from said first position.

8. The combination as specified in claim 7 and means to raise and lower said support table for said slide member, and means on said slide member to sense when said slide member contacts a surface in a vehicle to be loaded, said means to sense when said slide member contacts said surface controlling said means to raise and lower said table to cause leveling of said table with respect to the vehicle to be loaded.

9. The combination as specified in claim 7 wherein said means to move said slide member into said vehicle comprise friction drive wheels on said table, said friction drive wheels normally being free wheeling in one direction to permit said slide member to move rearwardly out of said vehicle.

10. The combination as specified in claim 7 and roller means rotatably mounted on said slide member to support load members.

11. The combination as specified in claim 7 wherein said pusher member is slidably mounted on said slide member, and positioned to engage objects on said slide member, said drive means and means to retract comprising a chain drive mounted on said slide to move said pusher member in a repeating path along the length of said slide member in a first direction and to reverse said movement of said pusher when the pusher member has reached its first position to return said pusher member toward a second end of said slide.

* * * * *

PO-1050
(5/69)

UNITED STATES PATENT OFFICE
CERTIFICATE OF CORRECTION

Patent No. 3,727,777      Dated April 17, 1973

Inventor(s) Douglas R. Hanson

It is certified that error appears in the above-identified patent and that said Letters Patent are hereby corrected as shown below:

Column 3, line 16 "norton" should be --Norton--. Column 5, line 26 "slid" should be --slide--. Column 6, line 32 "psher" should be --pusher--. Column 7, line 20 "slid" should be --slide--; Column 7, lines 66 and 67 "swtich" should be --switch--. Column 10, line 49 (Claim 3, line 8), "laoded" should be --loaded--; Column 10, line 34 (Claim 1, line 16), before "means" insert --and--. Column 12, line 9 (Claim 10, line 3), "load members" should be --said object--.

Signed and sealed this 19th day of March 1974.

(SEAL)
Attest:

EDWARD M. FLETCHER, JR.
Attesting Officer

C. MARSHALL DANN
Commissioner of Patents